(12) United States Patent
Shabtay et al.

(10) Patent No.: US 8,488,258 B2
(45) Date of Patent: Jul. 16, 2013

(54) ENHANCED DEPTH OF FIELD BASED ON UNIFORM RELATIVE ILLUMINATION VIA LENS WITH LARGE DISTORTION

(75) Inventors: Gal Shabtay, Tel-Aviv (IL); Ephraim Goldenberg, Tel-Aviv (IL); Pavel Reshidko, Tel-Aviv (IL); Noy Cohen, Tel-Aviv (IL)

(73) Assignee: DigitalOptics Corporation Europe Limited, Galway (IE)

( * ) Notice: Subject to any disclaimer, the term of this patent is extended or adjusted under 35 U.S.C. 154(b) by 168 days.

(21) Appl. No.: 13/154,938

(22) Filed: Jun. 7, 2011

(65) Prior Publication Data
US 2012/0314296 A1 Dec. 13, 2012

(51) Int. Cl.
*G02B 9/60* (2006.01)
(52) U.S. Cl.
USPC .......................................................... 359/764

(58) Field of Classification Search
USPC .................................................. 359/763, 764
See application file for complete search history.

(56) References Cited

U.S. PATENT DOCUMENTS
2010/0254029 A1* 10/2010 Shinohara ..................... 359/764

* cited by examiner

*Primary Examiner* — Joseph P Martinez
(74) *Attorney, Agent, or Firm* — Turocy & Watson, LLP; Vinay Joshi (57) ABSTRACT

A lens system is provided that comprises an enhanced depth of field based on a uniform or near uniform relative illumination via a lens with a large distortion. The distortion can be corrected with image processing equipment. The lens system can comprise an aperture stop and a group of lens, wherein there can be about five lenses in the group of lenses. The lens system is designed for relative illumination such that the light distribution over the lens system is substantially uniform.

20 Claims, 11 Drawing Sheets

ENHANCED DEPTH OF FIELD BASED ON UNIFORM RELATIVE ILLUMINATION VIA LENS WITH LARGE DISTORTION

FIELD OF THE INVENTION

The following relates generally to imaging optics, and more specifically to a lens architecture in conjunction with a distorted image for relative illumination such that the light distribution over the lens is substantially uniform.

BACKGROUND

A digital camera or video recorder employs one or more optical lenses to form a real image of an object onto a sensor. This sensor is generally a pixilated electro-optical device that outputs an electrical response to the real image formed onto the sensor. The electrical response can be manipulated to reform the real image on a digital optical display, such as a liquid crystal display (LCD). Technological advancements have enabled fabrication of smaller-sized sensors and optical components, thus, digital cameras and video recorders have been integrated into more and more consumer devices.

The use of digital imaging sensors and micro optics for cameras and video recorders has made the continuing miniaturization of these devices possible. As a result, camera modules have been integrated into small electronic devices, including hand-held devices such as cell phones, smartphones and personal digital assistants (PDAs), computing devices such as laptops, net-books and desktop computers, display devices such as televisions, monitors and graphics displays, hidden or conspicuous surveillance equipment, and so forth. Improvements in image sensors have provided high resolution image detectors utilizing micro-scale pixilation, and at high signal to noise ratio and increasingly lower cost.

Any lens design should address the need to increase the Depth of Field (DoF) on the one hand and should enable the capture of an image under non-ideal lighting conditions, such as interior residential lighting conditions. These concerns can be difficult to satisfy with a standard lens system due to an effect known as "relative illumination", which derives from variations in intensity according to the positions of digital pixel sensors in the field of view of the lens. In other words, non-uniform relative illumination generally results in a large disparity of light irradiating from different portions of a digital sensor. Thus, some areas of an image appear bright while other areas appear dim, reducing image quality.

Increased DoF is desirable in photography, as it allows for objects having a broader range of distances from a camera (both far and near) to appear in focus. For simple point-and-click camera modules without depth of focus adjustment, a lens design with a high DoF can greatly impact perceived camera quality. While distortion characteristics can be employed for altering DoF, high distortion can also cause poor relative illumination. Consequently, it would be desirable to have an optical system that can provide a distorted image for large DoF, as well as low variation in relative illumination across the field of view with no moving parts.

SUMMARY

A simplified summary is provided herein to help enable a basic or general understanding of various aspects of exemplary, non-limiting embodiments that follow in the more detailed description and the accompanying drawings. This summary is not intended, however, as an extensive or exhaustive overview. Instead, the sole purpose of this summary is to present some concepts related to some exemplary non-limiting embodiments in a simplified form as a prelude to the more detailed description of the various embodiments that follow.

In certain embodiments, the subject disclosure provides a lens design with a relatively uniform illumination over an entire sensor area. The lens design is suitable for use in portable equipment such as camera phones and similar devices that use Charged-Coupled Devices (CCDs), Complementary Metal-Oxide-Semiconductors (CMOSs), or other techniques for imaging. The lens design is based on a small and deliberate deformation of one or more lenses to obtain an increased Depth of Field (DoF) within a lens system, such as a regular lens system. This intentional distortion can be corrected by image processing that produces a rectified image. As an example, provided is a high-resolution relatively uniform illumination imaging lens. For this example, the uniform (or near uniform) illumination lens can comprise an F number of about 3.5, in which pixel size is reduced to around 1.4 micrometers in order to fit 5 M pixels into a given silicon space.

An advantage of the one or more disclosed aspects is a lens design having an increase in the DoF with a higher F-number lens while achieving comparable illumination at the sensor as a lens having a lower F-number and a more narrow DoF.

These and other embodiments are described in more detail below.

BRIEF DESCRIPTION OF THE DRAWINGS

Various non-limiting embodiments are further described with reference to the accompanying drawings in which.

DETAILED DESCRIPTION

Overview

With the use of lens systems on various devices, including portable devices (e.g., camera phones and so forth) there might be situations where lighting conditions are less than ideal but there is still a need to increase a Depth of Field (DoF). Thus, it would be beneficial to allow for a lens design that is compact and configured to capture images over a large depth of field (DoF) and that provide good relative illumination such that the light distribution over the lens is near uniform.

An aspect relates to a lens system designed to provide a distorted image and good relative illumination. The lens system comprises an aperture stop and a group of lenses in a fixed position along an optical axis. Included in the group of lenses are a first lens, a second lens, a third lens, a fourth lens, and a fifth lens. The first lens comprises a positive refractive power and a convex surface on an object side near an optical axis. The second lens comprises a negative refractive power and a meniscus shape in which a concave surface is on the object side near the optical axis. The third lens comprises a shape in which the convex surface is on the object side near the optical axis. The fourth lens comprises a shape in which the convex surface is on the object side near the optical axis. The fifth lens comprises a small negative refractive power and a meniscus shape in which the concave surface is on the object side near the optical axis. The aperture stop and the group of lenses are arranged along the optical axis in order from the object side. At least one surface of the first lens is aspherical. Further, both surfaces of each of the second lens, the third lens, the fourth lens, and the fifth lens are aspherical.

In an embodiment, the first lens, the second lens, the third lens, the fourth lens, and the fifth lens are made of optical plastic. Further, the following conditions are satisfied:

$$v\_d1 - v\_d2 > 30 \text{ and } v\_d4 - v\_d3 > 30$$

where: v_d1 is a first Abbe number of the first lens; v_d2 is a second Abbe number of the second lens; v_d3 is a third Abbe number of the third lens; and v_d4 is a fourth Abbe number of the fourth lens. A ratio of a total track length (TTL) of the lens system to an image circle diameter is less than about 1.172 and a ratio of a back focal distance to an effective focal length is less than 0.155.

In another embodiment, the group of lenses comprises a field of view between about 45 degrees and about 30 degrees. In accordance with some embodiments, a zoom lens comprises a field of view between about 40 degrees and about 35 degrees. In a further embodiment, the group of lenses includes only five lens elements.

In an embodiment, opposing surfaces of the first lens and the second lens are aspheric. The third lens comprises a positive refractive power, the fourth lens comprises a small positive refractive power, and the fifth lens comprises a small negative refractive power.

In some embodiments, an equation $f\_1/f < 0.72$ is satisfied, where $f\_1$ is a focal length of the first lens and f is an effective focal length of the lens system. The fifth lens can comprise a varying optical power, which is negative at its vertex and increases positively with radial distance from the vertex. Additionally or alternatively, the lens system comprises a varying distortion, wherein a maximal distortion is about 8.5 percent and the varying distortion is increased by an increase in field of view from the optical axis, where a maximal distortion obtained at an half angle of view is about 27.11 degrees (or about 27.11 degree from the optical axis).

In some aspects, the group of lenses comprises a F number of about 3.5. Further, this group of lenses comprises a through focus modulation transfer function (MTF) that indicates an MTF contrast level of at least about 0.15 at a spatial frequency of about one-half of a Nyquist frequency of a sensor for a given object distance associated with an image distance from the lens system.

In another embodiment, the MTF varies with the image distance such that the MTF is at maximum value greater than about 0.5 at a selected first object distance corresponding to 1000 mm distance and decreases from about a maximum MTF to a lower value that is greater than about 0.15 corresponding to an object distance of about of 380 mm.

In still another embodiment, a variation in chromatic focal shift of an imaging lens is about 8.4 micrometers. This variation is measured for a range of wavelengths from 0.4200 to 0.6560. Further, this variation peaks at about 8.4 micrometers between wavelengths of about 0.48 micrometers to about 0.65 micrometers. In another embodiment, a relation of lateral color of an imaging lens is about 0.5-1 micrometers. In yet another embodiment, the lateral color characteristic ranges from less than about 0.9 micrometers to about −1 micrometers.

In another embodiment, a refractive index of each lens in the group of lenses is within a range of about 1.5 to 1.65 and respective Abbe numbers of the first lens, the fourth lens, and the fifth lens are between around 50 to 60. Further, respective Abbe numbers of the second lens and the third lens are between about 20 and 30. Thus, in this embodiment, a lens system can have a first lens with a first Abbe number in a range of about 1.5 to 1.65, a second lens with a second Abbe number in a range of about 20 to 30, a third lens with a third Abbe number in the range of about 20 to 30, a fourth lens with a fourth Abbe number in the range of about 1.5 to 1.65, and a fifth lens with a fifth Abbe number in the range of about 1.5 to 1.65. In at least one aspect of the subject disclosure, the first Abbe number, fourth Abbe number, and the fifth Abbe number are all equal, whereas in another aspect, the second Abbe number and the third Abbe number are equal. In still another aspect, a combination of the foregoing equalities is true for the lens system.

In another embodiment is an optical system arranged along an optical axis. The optical system comprises a first lens comprising a positive refractive power and a convex object side surface and a second lens comprising a negative refractive power and a concave object side surface. The optical system also comprises a third lens and a fourth lens both comprising respective convex object side surfaces and a fifth lens comprising a negative refractive power and a concave object side surface. The first lens, the second lens, the third lens, the fourth lens, and the fifth lens are made of plastic. Further, the following conditions are satisfied: v_d1−v_d2>30 and v_d4−v_d3>30, where: v_d1 is a first Abbe number of the first lens; v_d2 is a second Abbe number of the second lens; v_d3 is a third Abbe number of the third lens; and v_d4 is a fourth Abbe number of the fourth lens. A ratio of a total track length of the optical system to an image circle diameter is less than about 1.172 and a ratio of a back focal distance to an effective focal length is less than 0.155.

In some embodiments, the first lens, the second lens, the third lens, the fourth lens, and the fifth lens are in a fixed position along the optical axis. In some embodiments, opposing surfaces of the first lens and the second lens are aspheric and the third lens comprises a positive refractive power and the fourth lens comprises a negative refractive power.

According to some embodiments, the optical system comprises a varying distortion, wherein a maximal distortion is about 8.5 percent and the varying distortion is increased by an increase in an angle of a field of view where the maximal distortion obtained at a half angle of view is about 27.11 degrees.

A further aspect relates to a camera module for an electronic device. The camera module comprises a set of lenses arranged along an optical axis in order from the object side for producing a real image of an object with a distorted image for relative illumination such that a light distribution over the set of lenses is substantially uniform. The set of lenses comprises a first lens comprising a positive refractive power and a convex surface on an object side near an optical axis, a second lens comprising a negative refractive power and a meniscus shape in which a concave surface is on the object side near the optical axis, a third lens comprising a shape in which the convex surface is on the object side near the optical axis, a fourth lens comprising a shape in which the convex surface is on the object side near the optical axis, and a fifth lens comprising a small negative refractive power and a meniscus shape in which the concave surface is on the object side near the optical axis. The camera module also comprises an optical correction module that provides distortion correction to produce a rectified image.

In some embodiments, at least one surface of the first lens is aspherical, both surfaces of each of the second lens, the third lens, the fourth lens, and the fifth lens are aspherical. The first lens and the fourth lens are made of a first type of optical plastic, the second lens and the third lens are made of a second type of optical plastic and the fifth lens is made of a third type of optical plastic. According to some embodiments, the set of lenses are arranged in a fixed position along an optical axis.

Herein, an overview of some of the embodiments for enhancing a depth of field based on a uniform (or near uniform) relative illumination utilizing a lens with large distortion has been presented above. As a roadmap for what follows next, various exemplary, non-limiting embodiments and features for lens systems are described in more detail. Then, some non-limiting implementations and examples are given for additional illustration.

In addition, it should be apparent that the teaching herein can be embodied in a wide variety of forms and that the specific structures or functions disclosed herein are merely representative. Based on the teachings herein one skilled in the art should appreciate that the disclosed aspects can be implemented independently of other aspects, and that two or more of these aspects can be combined in various ways. For example, an apparatus can be implemented and/or a method practiced using any number of the aspects set forth herein. In addition, an apparatus can be implemented and/or a method practiced using other structures and/or functionality in addition to or other than one or more of the aspects set forth herein. As an example, many of the apparatuses and lens systems disclosed herein are described in the context of providing relative illumination for a compact optical imaging system. One skilled in the art should appreciate that similar techniques could apply to other optical lens architectures. For example, the lens arrangements used herein may be used in fixed focus, mechanical focus or auto-focus systems whereby the optical arrangement or a subset thereof is automatically or manually displaced relative to the image plane.

Figure 1:
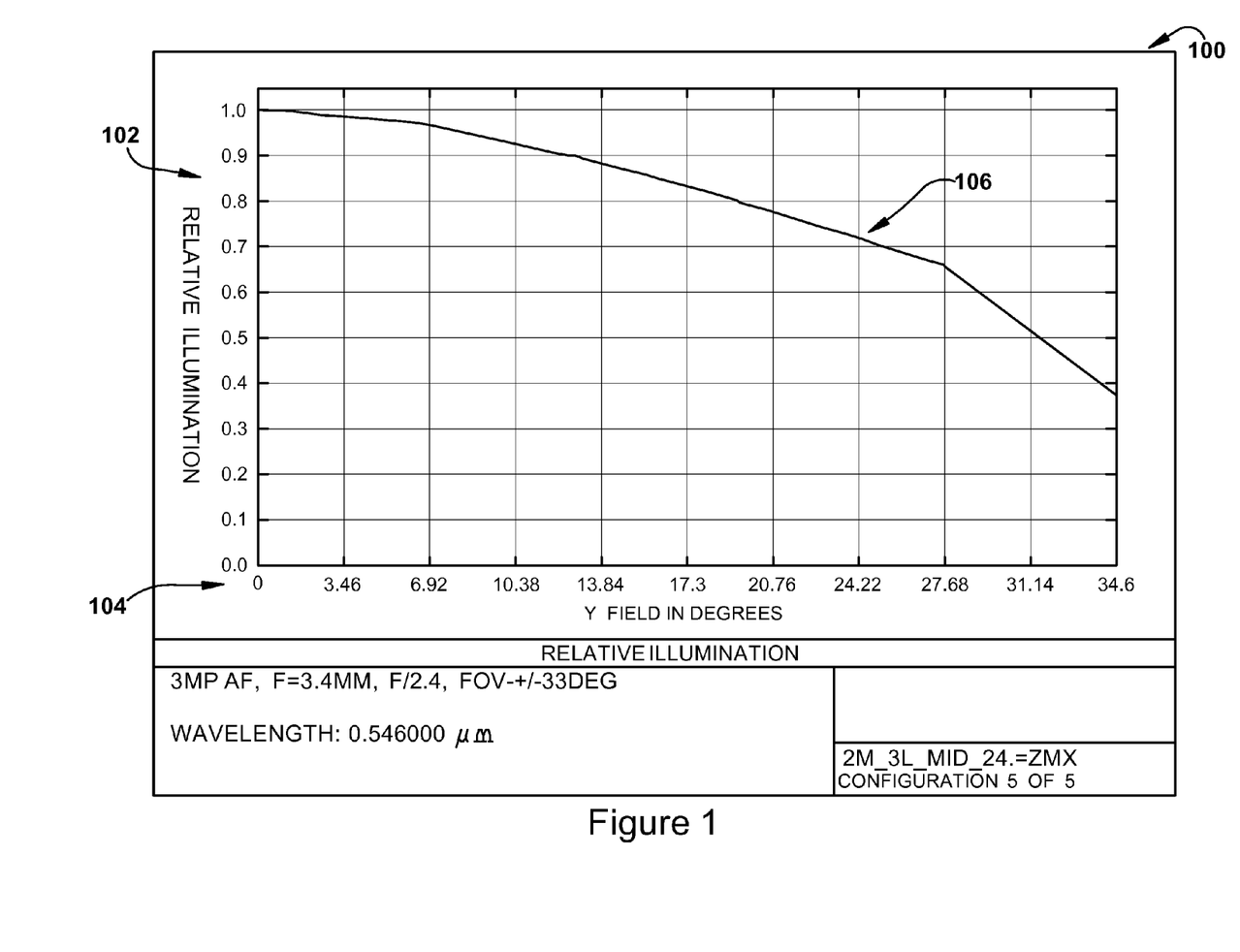
FIG. 1 illustrates a typical relative illumination graph having a non-uniform relative illumination.

Enhanced Depth of Field Based on Uniform Relative Illumination Via Lens with Large Distortion Referring now to the drawings, FIG. 1 illustrates a typical relative illumination graph 100 having a non-uniform relative illumination. Lenses form images using energy that is collected from an object and the image is proportional to an aperture size. The distribution of the energy over the sensor is non-uniform, whereby the illumination of the off-axis image points is lower than for image points located on the axis. This effect is known as relative illumination, which induces a variation of the pixel values on a digital image according to the positions of the pixels in the field. As illustrated in the graph 100, relative illumination 102 is represented on the vertical axis and Y Field in Degrees 104 is represented along the horizontal axis. The curve 106 represents the darkening result, depending on the position within the image.

The relative intensity on the sensor is inversely proportional to the square of the effective F-number. Thus, the F number increases with the distance from the optical axis, giving rise to a non-uniform Depth of Field (DoF) that increases with the F number. This optical relationship between the F-number and the DoF of a standard lens can create a problem when trying to provide a solution to photography under inadequate lighting conditions that require a lens with a low F-number to enable more light to reach the sensor.

On the other hand, lowering the F-number reduces the DoF. Any lens design must therefore, address the desire to increase the DoF on the one hand and to enable the ability to capture an image under non-ideal lighting conditions, such as interior residential lighting conditions.

The disclosed aspects provide a lens design with a relatively uniform illumination over the entire sensor area. This design is based on a small and deliberate deformation of the lens to obtain an increased DoF within a regular lens system. The lens is deformed in such a way that the relative light power projected by the lens design near the center of the sensor is lower than the relative power projected by a conventional lens in a similar area of the sensor. Further, in accordance with the disclosed aspects, the relative power projected by the lens design in the peripheral area of the sensor is higher than the relative power projected by a conventional lens in the peripheral area. Thus, for the lens designs disclosed herein, the total light incident on the sensor is substantially equal to the total light projected by a regular (or conventional) lens onto the sensor.

It can be customary to set the F-number according to the light power at the center of the image, where its value is generally highest. The disclosed aspects allow for definition of a new F-number that takes into account the fact that relative illumination is uniform or near uniform (e.g., within about 10 percent or around 20 percent) throughout the entire sensor area. The lens design of the disclosed aspects is based on F/3.5 that is substantially uniform over the entire sensor, resulting in an increased DoF. Under normal lighting conditions, this accomplishment is not achieved at the expense of image quality since image quality is determined by the total amount of light obtained in the sensor. This is because in accordance with the disclosed aspects, the total amount of light obtained on the sensor is not changed but is distributed evenly, as described above.

The principle of uniform relative illumination is obtained using a lens design that leads to a distorted image on the sensor such that the light distribution over the lens is substantially uniform. The disclosed aspects provide a lens that produces a distorted image, which can then be corrected during image processing by using a distortion correction function. An advantage of the various aspects disclosed herein is that the disclosed aspects enable an increase of the DoF with a higher F-number while maintaining sensor illumination commensurate to that obtained with a regular lens with a low F-number and narrow DoF.

Figure 2:
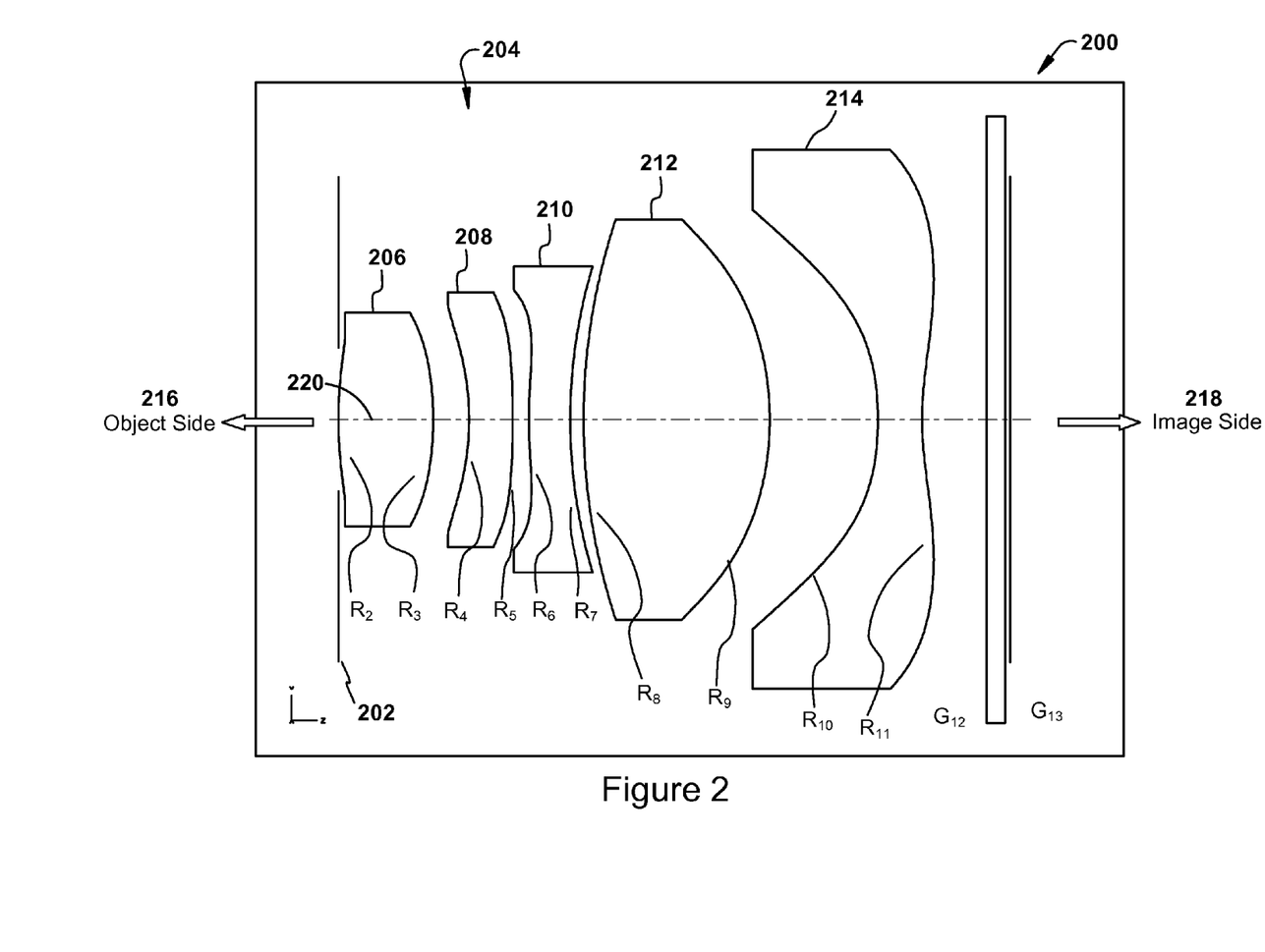
FIG. 2 illustrates a cross-sectional block diagram of an example imaging lens, according to an aspect.

FIG. 2 illustrates a cross-sectional block diagram of an example imaging lens 200, according to an aspect. The specific details in this disclosure are provided for a 5 Mp sensor with a 1.4 micrometer pixel size and an F-number of F/3.5. However, it should be understood that the disclosed aspects are not limited to this sensor and other sensors can be utilized with the disclosed aspects.

The imaging lens 200 can comprise a distorted lens system that is designed to provide a distorted image for uniform or near uniform relative illumination with no moving parts and/or comprising a group of lenses in a fixed position along an optical axis. As shown, the imaging lens 200 comprises an aperture stop 202. Imaging lens 200 also comprises a group of lenses 204. In accordance with some aspects, the group of lenses 204 comprises five or more lens elements. According to some aspects, the group of lenses 204 comprises only five lens elements. According to some aspects, the group of lenses 204 comprises a field of view between about 45 degrees and about 35 degrees. In accordance with some aspects, the imaging lens 200 comprises a zoom lens that can include five lens elements. In accordance with some aspects, the zoom lens comprises a field of view between about 40 degrees and about 35 degrees.

The illustrated imaging lens 200 comprises an arrangement of lenses including a first lens 206, a second lens 208, a third lens 210, a fourth lens 212, and a fifth lens 214. The lenses in the group of lenses 204 are ordered from an object side 216 to an image side 218 in a similar manner relative to an optical axis 220 (e.g., optical axis X). Further, the aperture stop 202 can be located in front of the group of lenses 204, near the object side 216. For example, the aperture stop 202 is located in the front, on the object side 216. Next, in order, are the first lens 206 through fifth lens 214, located near the image side 220.

Each lens in the group of lenses 204 can have two surfaces. These surfaces can have respective radii of curvature, which are denoted (from the object side 216 to the image side 218) by the letter R followed by a number identifying their surfaces and denoting their order. More specifically, Ri is the axial curvature radius of the ith surface. Similarly, the refractive index n_i denotes the refractive index of the lens medium constituted by the ith surface. Note that in the Tables provided below, the surfaces are denoted by their numbers, e.g. R2 by 2, R3 by 3, and so forth, based on their order from the object side 216 of the imaging lens and are provided as specific numerical values; v_di is the Abbe number of the lens medium constituted between the i-th to the (i+1)th surfaces.

The term "lens" as utilized herein is defined as a single, transparent mass of refractive material with two opposing refractive surfaces, which surfaces are positioned at least generally transversely of the optical axis of the imaging lens.

It is possible to have lens surfaces that are concave, convex, or various combinations thereof for one or more of the lenses included in an embodiment of imaging lens 200. In accordance with some aspects, the first lens 206 comprises a positive refractive power, where surfaces R2 and R3 are convex. Thus, at least one convex surface of the first lens is on an object side 216 near an optical axis 220. The first lens 206 can be small in comparison to the other lenses of imaging lens 200.

The second lens 208 can comprise a negative refractive power and a meniscus shape, where surfaces R4 and R5 are, respectively, concave and convex. Thus, the concave surface of the second lens 208 is on the object side 216 near the optical axis 220.

The third lens 210 can comprise a positive refractive power, where surfaces R6 and R7 are respectively, convex and concave. In accordance with some aspects, the third lens comprises a shape in which a convex surface is on the object side 216, near the optical axis 220. According to some aspects, the third lens 210 may comprise a small negative refractive power. The third lens 210 can also comprise a varying power, which is positive at its vertex and can increase negatively with radial distance from the vertex.

The fourth lens 212 comprises a shape, wherein a convex surface is on the object side 216 near the optical axis 220. Further, the fourth lens 212 can have a positive refractive power, where surfaces R8 and R9, are convex. In accordance with some aspects, the fourth lens 212 comprises a small refractive power. The fourth lens 212 may also comprise a small negative refractive power.

According to an aspect, the fifth lens 214 comprises a meniscus shape, wherein a concave surface is on the object side 216 near the optical axis 220. In accordance with some aspects, the fifth lens 214 comprises a negative refractive power, where surfaces R10 and R11 are concave. According to some aspects, the negative refractive power of the fifth lens 214 can be a small negative refractive power. The fifth lens 214 may also comprise a small positive refractive power. The fifth lens 214 can also comprise a varying power, which is negative at its vertex and increases positively with radial distance from the vertex.

In accordance with some aspects, at least one surface of the first lens 206, the second lens 208, the third lens 210, the fourth lens 212, and the fifth lens 214 has an aspheric shape. According to some aspect, both surfaces of each of the first lens 206, the second lens 208, the third lens 210, the fourth lens 212, and the fifth lens 214 are aspherical. In accordance with some aspects, lenses can comprise both surfaces that are aspheric, which can make it easier to achieve a bright image and aberration corrections.

In at least one embodiment, each lens surface can be comprised of a particular material and surfaces can be composed of different materials. Each lens surface can also have a refractive index (not labeled in FIG. 2), denoted as N1 and N2 for first lens 206, N3 and N4 for second lens 208, N6 and N7 for third lens 210, N8 and N9 for fourth lens 212, and N10 and N11 for fifth lens 214. In addition, surfaces comprising different materials can have different Abbe numbers.

In an example, the refractive index of the five lens elements is within a range of about 1.5 to 1.65. In this example, a first Abbe number of the first lens, a second Abbe number of the fourth lens, and a third Abbe number of the fifth lens are between 50 and 60. Further, a fourth Abbe number of the second lens and a fifth Abbe number the third lens are between 20 and 30. Further details related to refractive indices N1-N11, Abbe numbers of lens media, and other aspects of at least one embodiment of the imaging lens are provide with respect to the tables below.

In accordance with some embodiments, one or more of first lens 206, second lens 208, third lens 210, fourth lens 212, and fifth lens 214 can be made of plastic. For example, first lens 206 and fourth lens 212 can be made of a first type of optical plastic. In an embodiment, second lens 208 and third lens 210 can be made of a second type of optical plastic. In another embodiment, fifth lens 214 can be made of a third type of optical plastic. These materials can provide proper compensation for the lens design although other materials of similar refractive index and Abbe number could be used in their place. While these materials are given for example purposes, other materials, including (but not necessarily limited to) those of similar refractive index and Abbe number, can be used in one or more of the embodiments described herein or other alternatives that accord with the disclosed aspects.

In accordance with some aspects, the first lens, the second lens, the third lens, the fourth lens, and the fifth lens are made of plastic. In this aspect, the following condition can be satisfied:

$$v\_d1 - v\_d2 > 30 \text{ and } v\_d4 - v\_d3 > 30$$

where $v\_d1$ is a first Abbe number of the first lens, $v\_d2$ is a second Abbe number of the second lens, $v\_d3$ is a third Abbe number of the third lens, and $v\_d4$ is a fourth Abbe number of the fourth lens. Further, a ratio of a total track length (TTL) of the lens system to an image circle diameter is less than about 1.172, and a ratio of the back focal distance to an effective focal length is less than 0.155.

According to some aspects, lenses within the group of lenses 204 can exist within or be arranged according to lens groups. A lens group can be an assembly of one or more lens elements in optical series that move in concert (e.g., as a single unit) relative to another component (e.g., another lens group) along an optical axis during a zoom function. In an embodiment, a lens group can include elements other than a lens. In an example, a lens group can include a stop that controls an amount of light that passes through a lens group.

In accordance with some aspects, first lens 206, second lens 208, third lens 210, fourth lens 212, and fifth lens 214 can comprise a lens group. The lenses in the lens group can move, as a unit, with respect to a sensor. Distortion can be created in terms of moving lens groups. In accordance with some aspects, non-moving lenses or lens groups can produce similar distortion or other phenomenon applicable to the disclosed aspects and any description with respect to lens group motion is not intended to exclude embodiments in which the lenses or lens groups are immobile or fixed.

In at least one embodiment, information received from an object is transformed into distorted information on a sensor. The distorted information on the sensor can be magnified to comport with a desired zoom level or otherwise. The image can be represented using, for example, a two-dimensional coordinate system (e.g., Cartesian coordinate system) including two perpendicular axes on a plane. Objects, projections of objects, and images can all be represented according to such a coordinate system, although they do not necessarily need to be represented according to the same, or different, coordinate systems. In an embodiment, the image coordinate can be described by point (u, v) with respect to object coordinates (x, y), according to an embodiment.

A sensor can be a digital device comprising a multi-dimensional array (e.g., a two dimensional array) of electro-optical sensors, or pixels. Examples of such a device can include ea charge-coupled device (CCD) array, or a complementary metal-oxide semiconductor (CMOS) array, or the like. Each electro-optical sensor, or pixel, of such array can be configured to output an electric signal when irradiated with light. Furthermore, an amount of electric current for the electric signal can be directly related to energy density of light irradiating the pixel. Accordingly, by collecting output current levels from each pixel of the array, a sensor can digitally reproduce a two dimensional radiant energy pattern of light irradiating the sensor. Additionally, where the pixel surface or sensor plane of a sensor is placed at an image distance, the two-dimensional radiant energy pattern that is produced can be that of a real optical image generated by optical elements of imaging lens 200. Accordingly, a sensor can be utilized to digitally reduce the image. In accordance with some aspects, the sensor can be a 8 megapixel (Mp) sensor with a 1.4 micrometer (µm) pixel size and an F-number of 3.2. However, in accordance with some aspects, other sensors, pixel sizes, and/or F-number can be utilized.

Resolution of a digital image generated by a sensor can depend on a number of pixels within the sensor plane array, which in turn is dependent on pixel area and total array area. Thus, for example, for relatively square pixels approximately 1.4 microns per side (1.96 square microns), a 0.4 cm square sensor array can comprise as many as about 8.1 megapixels. Said differently, such a sensor would have resolution of about 8 Mp. Because the pixel array generates an electronic reproduction of a real image, data generated by a sensor in the form of electric signals can be saved to memory, projected to a display for viewing (e.g., digital display screen), edited in software, and so on. Thus, at least one application of imaging lens 200 is in conjunction with a digital camera or video camera comprising a digital display (not depicted). Furthermore, imaging lens 200 and other optical systems included in the subject disclosure can be implemented in conjunction with a camera module of an electronic device. Such an electronic device can include a wide array of consumer, commercial or industrial devices. Examples include consumer electronics, including a cell phone, smart phone, laptop computer, net-book, PDA, computer monitor, television, flat-screen television, and so forth, surveillance or monitoring equipment, including commercial equipment (e.g., ATM cameras, bank teller window cameras, convenience store cameras, warehouse cameras and so on), personal surveillance equipment (e.g., pen camera, eyeglass camera, button camera, and so forth), or industrial surveillance equipment (e.g., airfield cameras, freight yard cameras, rail yard camera, and so on). For instance in consumer electronics, because optical elements can comprise elements having fixed positions relative to other elements, and can have either static or dynamic position along the optical axis X, imaging lens 200 and other disclosed systems are well suited for various types of mini or micro camera modules. It is to be appreciated, however, that the disclosed systems are not limited to this or any other particular application described herein or elsewhere; rather, other applications known to those of skill in the art or made known by way of the context provided herein, are included within the scope of the subject disclosure.

The lens surfaces that are aspheric are defined by the following even aspheric equation:

$$Z = [(CY^2)/\{1+(1-(1+K)C^2Y^2)^{1/2}\}] + \mathrm{Sum}\_i(A\_iY^i) \quad \text{Equation 1.}$$

where Z is the length (in mm) of a line drawn from a point on the aspheric lens surface at a distance Y from the optical axis to the tangential plane of the aspheric surface vertex, C is the curvature of the aspheric lens surface on the optical axis, Y is the distance (in mm) from the optical axis, K is the conic constant, and A_i is the ith aspheric coefficient, and the summation extends over even number i.

Table 1 below lists the general lens data.

TABLE 1

General Lens Data

| | |
| --- | --- |
| Effective Focal Length | 4.190984 |
| Back Focal Length | 0.685 |
| Total Track | 5.531414 |
| Image Space F/# | 3.5 |
| Working F/# | 3.485957 |

Table 2 below lists a summary of surface data. Specifically, Table 2 lists the surface number in order from the object side, the radius of curvature R (in mm) of each surface near the optical axis (where R is related to the parameter C), and the curvature of the aspheric lens surface in Equation 1 (C=1/R). The thickness value represents the on-axis surface spacing along the optical axis X of the optical surfaces denoted in their order from the object side of the zoom lens. The table also includes the lens diameter. In the disclosed embodiments, the following parameters values and characteristics are utilized: F number F/3.5, and the total track length (TTL) is equal to about 5.53 mm. Note that for cover glass listed in Table 1 and Table 2 the TTL/image circle size<1.172.

TABLE 2

Surface Data Summary

| # | Type | Comment | Radius | Thickness | Nd/Vd | Semi-Diameter |
|---|---|---|---|---|---|---|
| 0 | STANDARD | | INFINITE | 881 | | 572.12276 |
| 1 | STANDARD | Stop 1 | INFINITE | 0 | | 0.59 |
| 2 | EVENASPH | L1-1 | 3.32135 | 0.7796 | 1.5339/55.986 | 0.69 |
| 3 | EVENASPH | L1-2 | −2.89763 | 0.29615 | | 0.88 |
| 4 | EVENASPH | L2-1 | −2.25206 | 0.35548 | 1.614/25.54 | 0.95 |
| 5 | EVENASPH | L2-2 | −60.96412 | 0.13792 | | 1.05 |
| 6 | EVENASPH | L3-1 | 3.95998 | 0.33984 | 1.614/25.54 | 1.07 |
| 7 | STANDARD | L3-2 | 4.43174 | 0.10948 | | 1.26 |
| 8 | STANDARD | L4-1 | 5.27177 | 1.53321 | 1.5339/55.986 | 1.65 |
| 9 | EVENASPH | L4-2 | −2.4435 | 0.89038 | | 1.65 |
| 10 | EVENASPH | L5-1 | −2.6028 | 0.36399 | 1.5311/55.35 | 1.73 |
| 11 | EVENASPH | L5-2 | 2.53137 | 0.53131 | | 2.22 |
| 12 | STANDARD | CG (D263T) | INFINITE | 0.15 | 1.5231/55 | 2.5 |
| 13 | STANDARD | | INFINITE | 0.044 | | |

Figure 3:
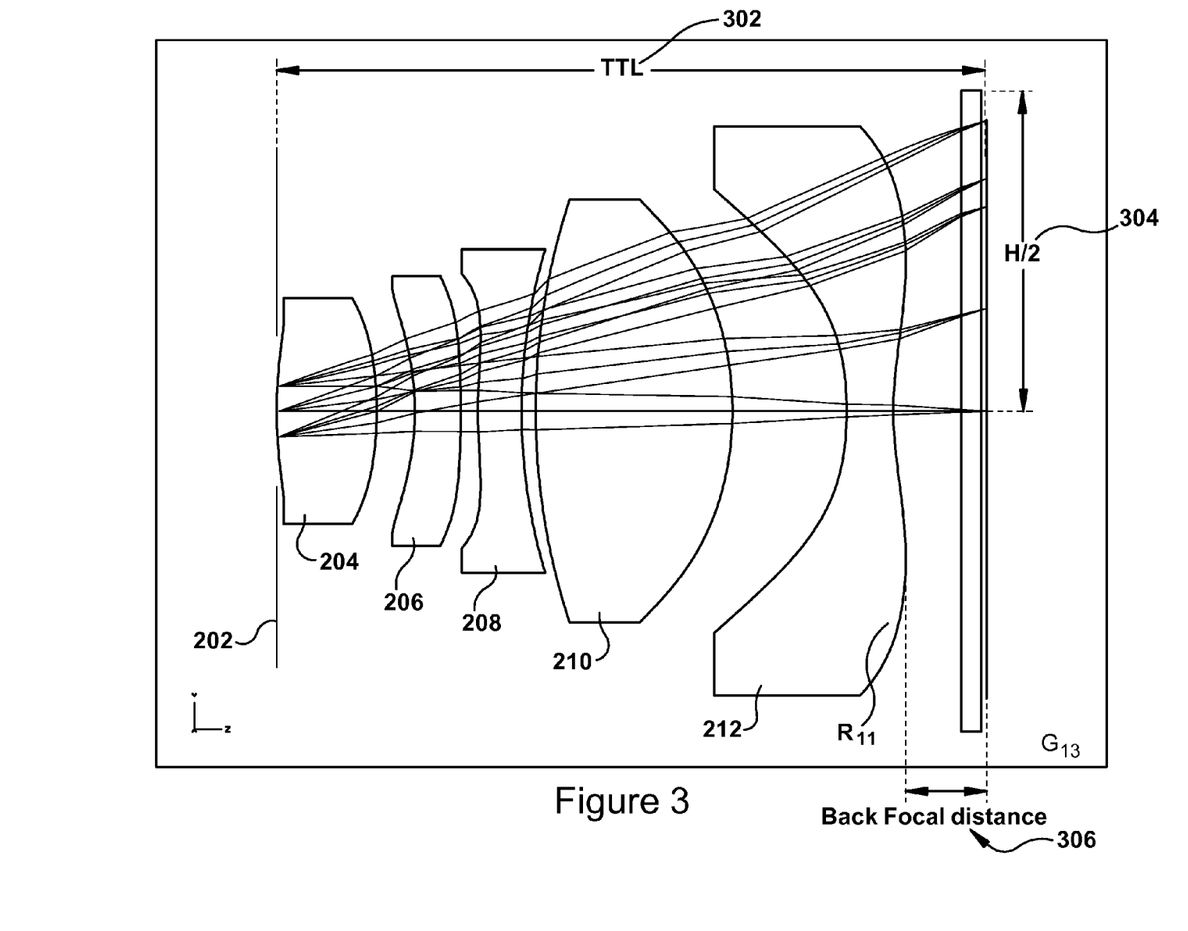
FIG. 3 illustrates a total track length (TTL) and an image height that give rise to the image circle, using a ray diagram of a lens system, according to an aspect.

FIG. 3 illustrates the TTL 302 and the image height 304 that give rise to the image circle, using a ray diagram of a lens system, according to an aspect. Further, the condition TTL/f<1.32 can be satisfied where f is the focal length of the entire lens system. Those conditions can provide for accurately correcting field curvature and reducing the TTL of the lens. If the above ratios of the TTL are reduced much more, it might be difficult to correct various aberrations. On the other hand, by increasing these ratios, the TTL of the lens can increase too much for achieving the desired compactness of the lens.

In accordance with some aspects, the third lens comprises a positive refractive power, the fourth lens comprises a small positive refractive power, and the fifth lens comprises a small negative refractive power. Additionally, this embodiment can satisfy the following condition:

$$f\_1/f < 0.72$$

where $f\_1$ is the focal length of the first lens and f is the effective focal length of the lens system. The conditions, $f\_1/f < 0.72$, correspond to a relatively high amount of optical power in the first lens element of the system, which can be utilized to keep the TTL of the lens system small. In addition, the imaging lens can satisfy the condition:

$$(b\_fd)/f < 0.151$$

where $b\_fd$ is the back focal distance 306. The back focal distance 306 is defined as the minimum distance from surface R11 to the imaging surface G13. These conditions allow for the insertion of a component, such as a filter, between the imaging lens and the imaging surface without compromising the compact imaging lens structure. Here the back focal length, $b\_f = 0.77$ (see Thickness 11, 12 and 13 of Table 1 above), which is defined as the axial distance from surface R11 to the imaging surface G13.

Table 3 below lists the values of the constants $A\_i$, for $i = 2, 4, 6, 8, 10, 12, 14, 16$ used in Equation 1 above in order to achieve the desired performance of a relative illumination lens. The table lists the values for each of the aspheric lens surfaces of Table 2 (above).

TABLE 3

Example Optical Surface Data

| # | Conic constant (K) | A_2 | A_4 | A_6 | A_8 |
|---|---|---|---|---|---|
| 2 | −13.5831 | 0 | −1.1179E−03 | −1.3766E−01 | 4.2685E−01 |
| 3 | 0.0000 | 0 | −9.3025E−02 | 3.2904E−02 | −8.4583E−02 |
| 4 | −29.6993 | 0 | −3.5395E−01 | 8.9777E−01 | −1.7201E+00 |
| 5 | 0.0000 | 0 | −2.5588E−01 | 4.6028E−01 | −7.4070E−01 |
| 6 | −65.4898 | 0 | −1.2984E−01 | 5.7809E−02 | −1.0720E−01 |
| 9 | 0.0000 | 0 | −4.2261E−03 | −5.9873E−03 | −1.1487E−03 |
| 10 | 0.0000 | 0 | −1.6473E−01 | 8.3879E−02 | −2.8304E−02 |
| 11 | −18.0944 | 0 | −5.9478E−02 | 1.8226E−02 | −3.3926E−03 |

| # | Conic constant (K) | A_2 | A_10 | A_12 | A_14 |
|---|---|---|---|---|---|
| 2 | −13.5831 | 0 | −1.1764E+00 | 1.3856E+00 | −2.4806E−01 |
| 3 | 0.0000 | 0 | 1.0137E−01 | −9.9626E−02 | 1.1099E−01 |
| 4 | −29.6993 | 0 | 2.3303E+00 | −1.9859E+00 | 9.8916E−01 |
| 5 | 0.0000 | 0 | 7.0031E−01 | −4.0914E−01 | 1.3096E−01 |
| 6 | −65.4898 | 0 | 3.3831E−02 | −2.1031E−03 | −2.5908E−02 |
| 9 | 0.0000 | 0 | 1.3853E−03 | −3.1797E−04 | 1.8690E−05 |
| 10 | 0.0000 | 0 | 7.2229E−03 | −9.0516E−04 | −2.8737E−06 |
| 11 | −18.0944 | 0 | −2.8781E−05 | 1.1676E−04 | −1.9510E−05 |

| # | Conic constant (K) | A_16 |
|---|---|---|
| 2 | −13.5831 | −5.1739E−01 |
| 3 | 0.0000 | −6.2029E−02 |
| 4 | −29.6993 | −2.1728E−01 |
| 5 | 0.0000 | −1.0170E−02 |
| 6 | −65.4898 | 2.0931E−02 |
| 9 | 0.0000 | 1.2153E−05 |
| 10 | 0.0000 | 7.1696E−06 |
| 11 | −18.0944 | 1.1025E−06 |

Figure 4:
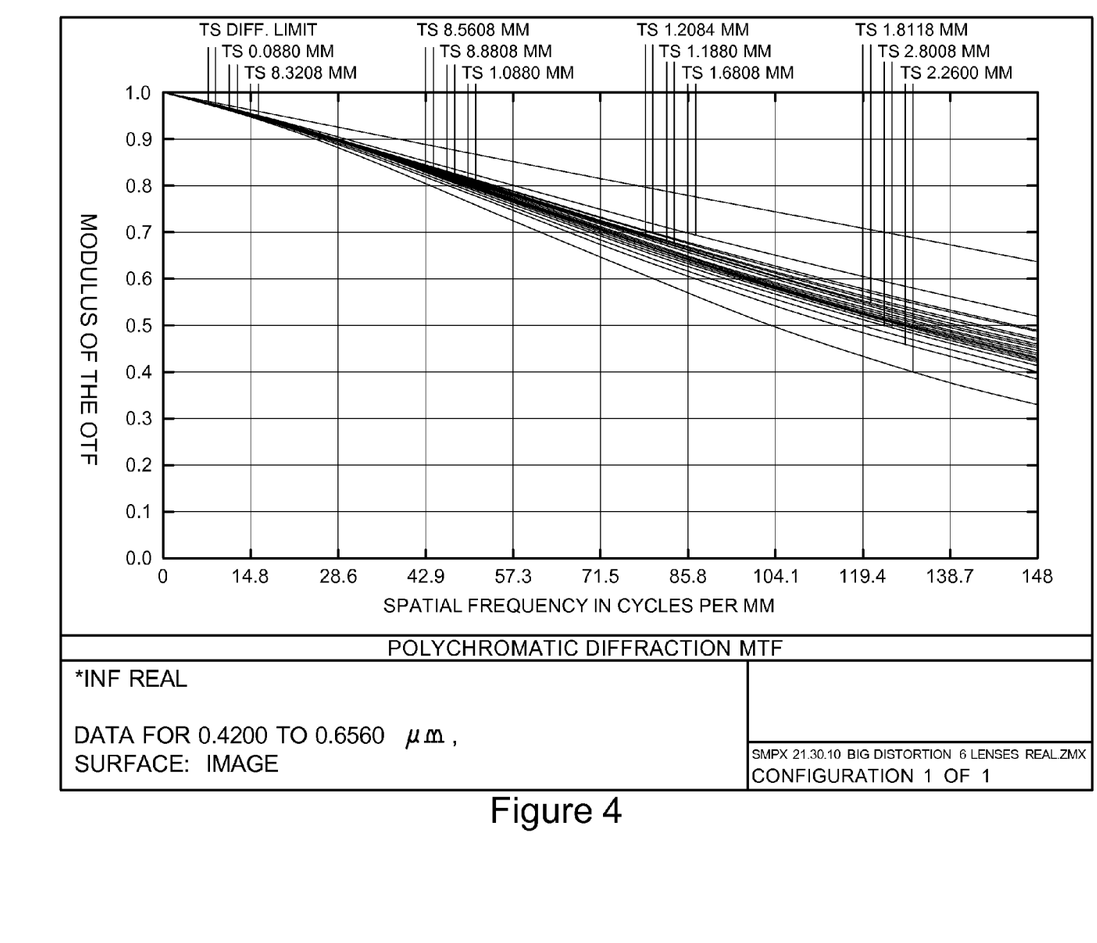
FIG. 4, FIG. 5, and FIG. 6 illustrate the calculated Modulation Transfer Function (MTF) curves for an imaging lens design having near uniform relative illumination for object distance of infinity, 1000 mm and 380 mm, respectively, at different light wave lengths, according an aspect.
Figure 5:
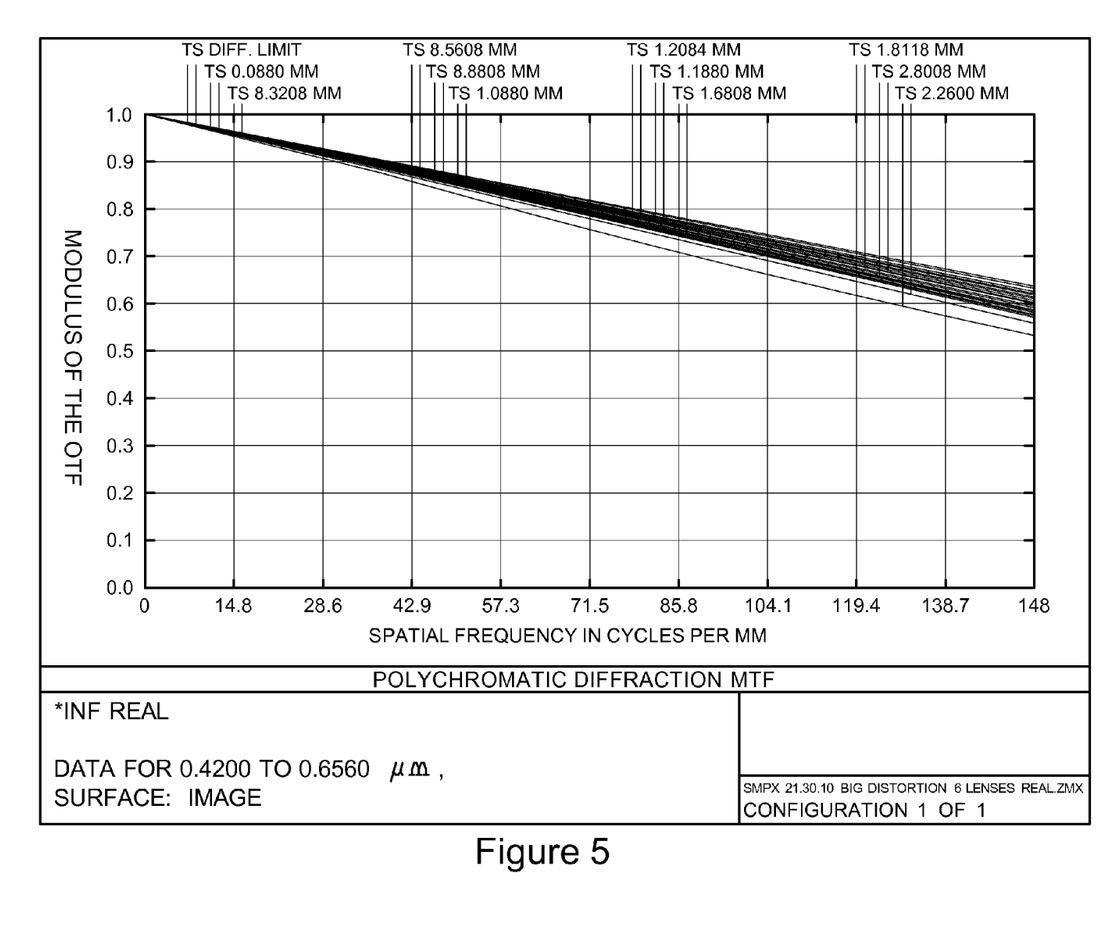
Figure 6:
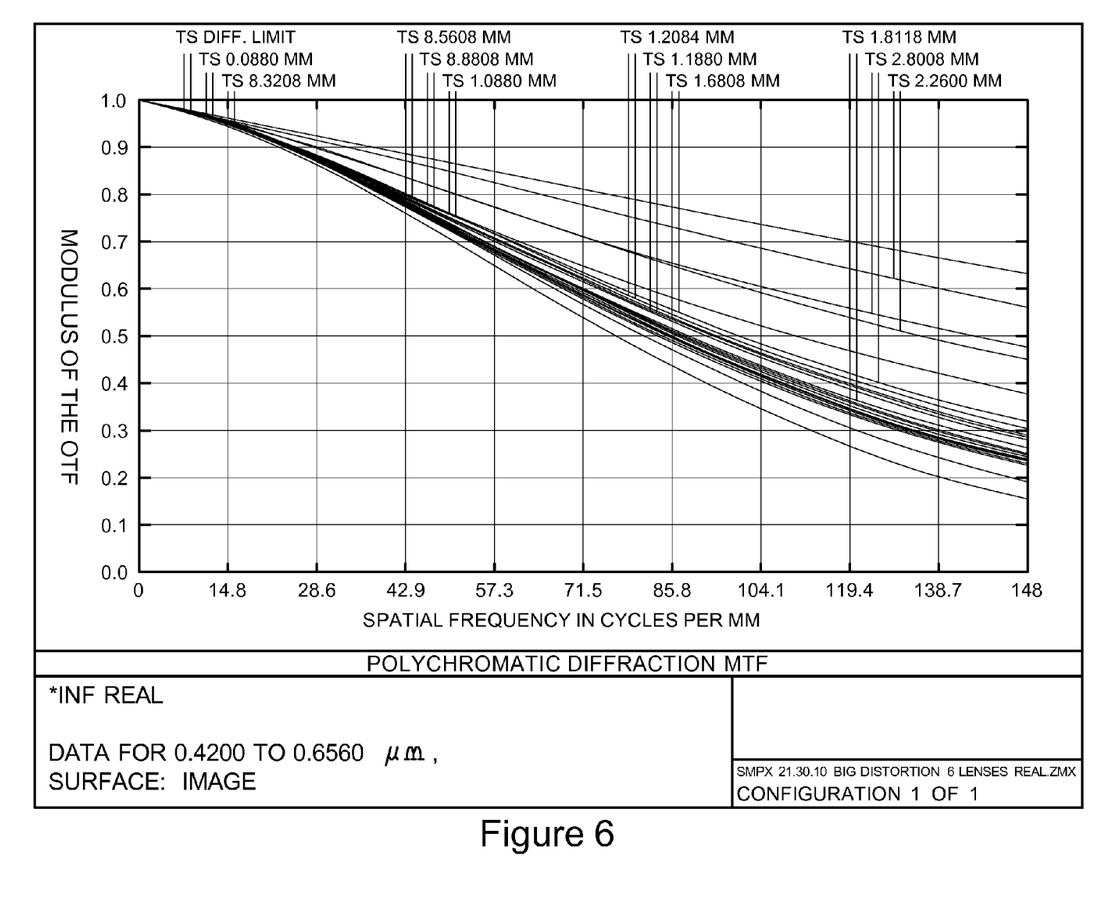

FIG. 4, FIG. 5, and FIG. 6 illustrate the calculated Modulation Transfer Function (MTF) curves for an imaging lens design having near uniform relative illumination for object distance of infinity, 1000 mm, and 380 mm respectively at different light wavelengths, according an aspect.

Figure 7:
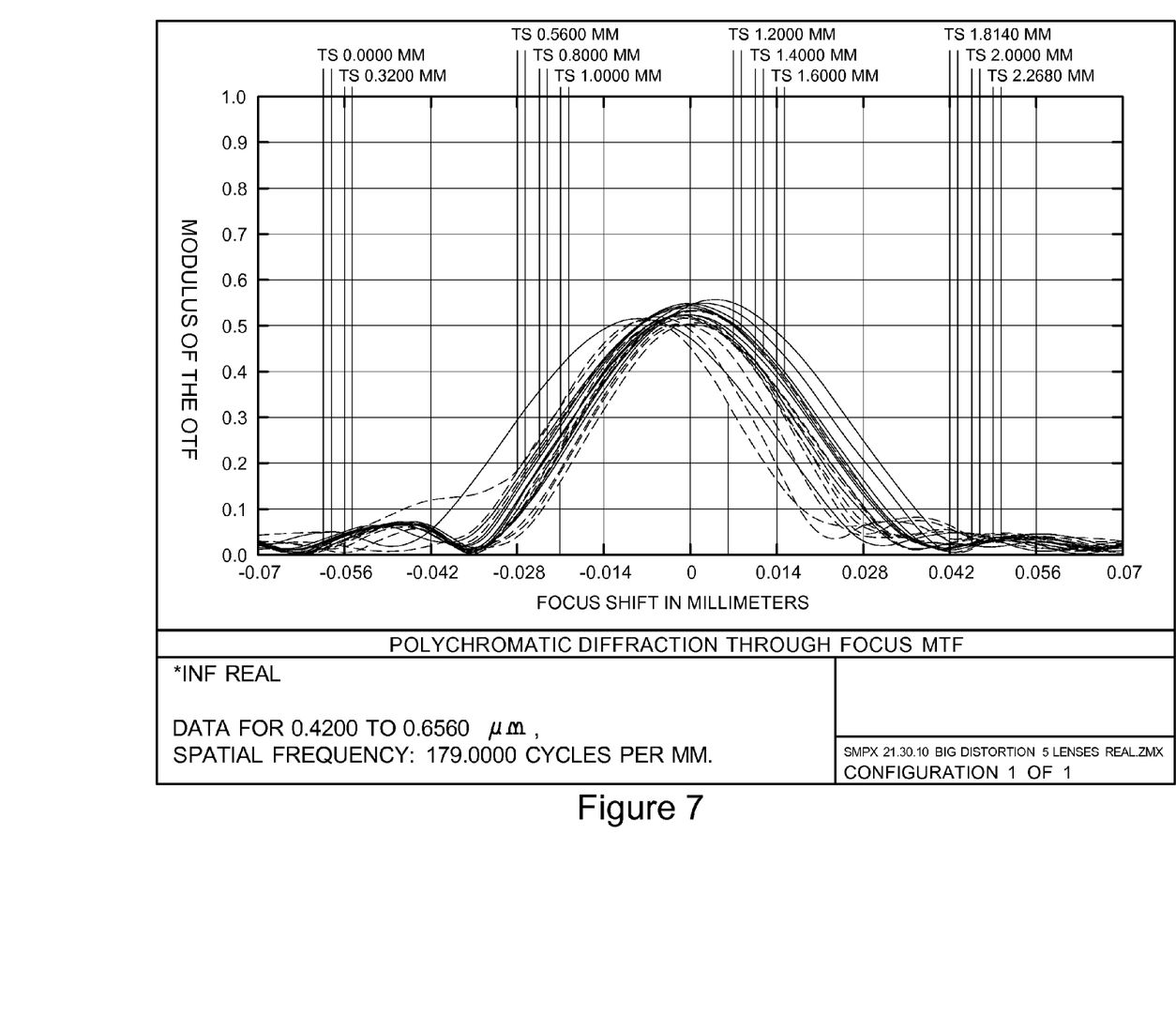
FIG. 7 illustrates the calculated through-focus Modulation Transfer Function at a spatial frequency of 179 cycles per mm versus defocus distance (in units of millimeters), according to an aspect.

FIG. 7 illustrates the calculated through-focus MTF at a spatial frequency of 179 cycles per mm versus defocus distance (in units of millimeters), according to an aspect. The left centered and right bars superimposed on the MTF correspond to delimit range of defocus distance over which the MTF is greater than 0.15. The focus shift of 0.006 mm, right bar, corresponds to object at a distance of infinity. The focus shift of 0 mm, center bar, corresponds to an object at a distance of 1000 mm. The focus shift of −0.021 mm, left bar, corresponds to object at a distance of 380 mm.

The defocus distances of 0.021 mm and 0.006 millimeters is the depth of field over which the range of defocus distances provide a contrast that is sufficient for resolving the image. FIG. 7 exhibits an enhanced depth of focus similar to a depth of focus that can be obtained by an Extended Depth of Focus (EDoF) lens. It is evident from FIGS. 4, 5, 6, and 7 that the 5 Mp imaging relative illumination lens with five lenses achieves DoF properties, substantially the same as the relative illumination obtained by imaging EDoF lenses.

In accordance with some aspects, the disclosed imaging lens is characterized by F-number of about 3.5 including through (MTF). The imaging lens indicates an MTF contrast level of at least about 0.15 at a spatial frequency of about one-half of a Nyquist frequency of a sensor for a given object distance associated with an image distance from the lens system. In accordance with some aspects, the MTF can vary with image distance such that the MTF is at a maximum value that is greater than about 0.5 at a selected first object distance that corresponds to 1000 mm distance and decreases from about the maximum MTF to a lower value that is greater than about 0.5 corresponding to an object distance of about 380 mm.

Figure 8:
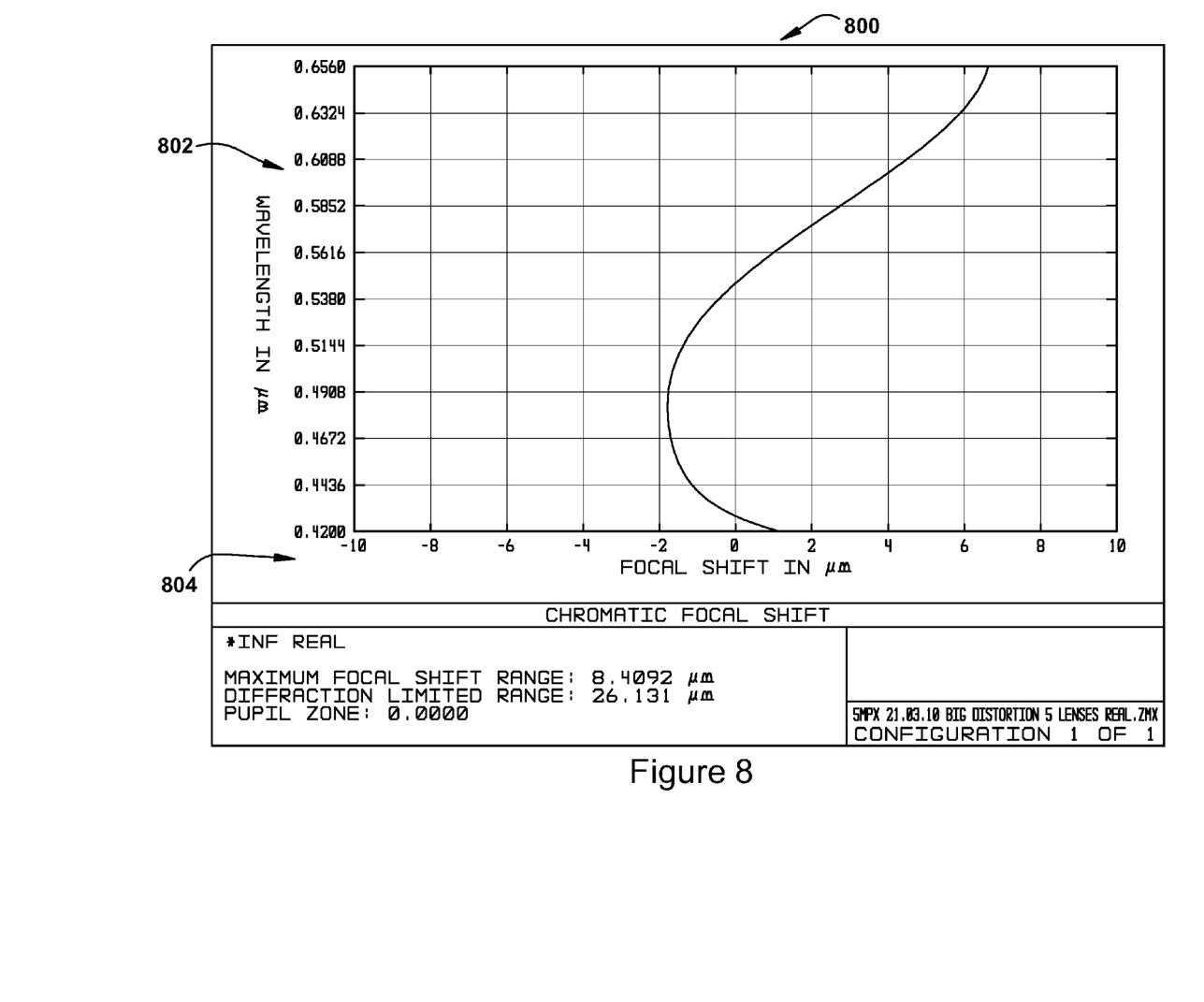
FIG. 8 illustrates a graph of a chromatic focal shift, according to an aspect.

FIG. 8 illustrates a graph 800 of a chromatic focal shift, according to an aspect. The wavelength 802 is illustrated along the vertical axis and the focal shift 804 is illustrated along the horizontal axis. As illustrated, the chromatic focal shift of the imaging relative illumination lens is about 8.4 micrometers, which is smaller than that of 60 micrometers in a conventional imaging lens.

Figure 9:
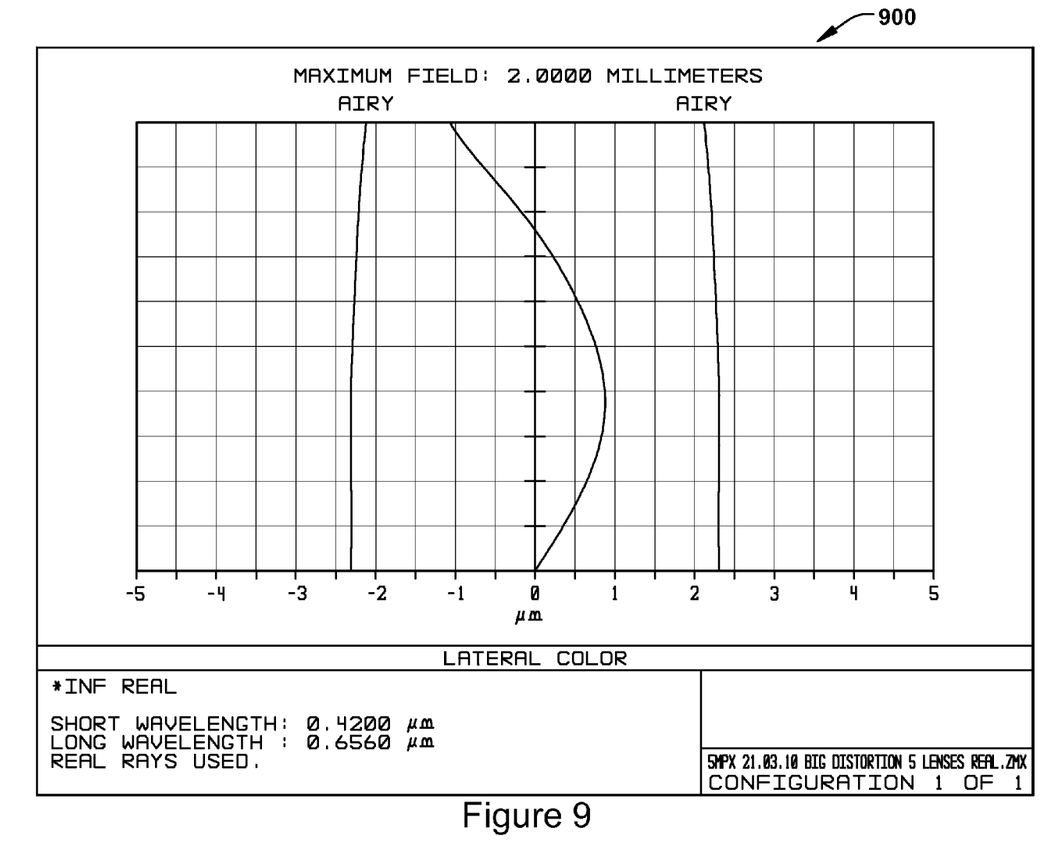
FIG. 9 illustrates a graph of lateral color, according to an aspect.

FIG. 9 illustrates a graph 900 of lateral color, according to an aspect. In accordance with some aspects, the relation of lateral color of the imaging lens is about 0.5 to 1 micrometer. As illustrated, the lateral color error of the imaging relative illumination lens can be about 1 micrometers. This lateral color error is similar to the value in a standard (or conventional) imaging lens.

Figure 10:
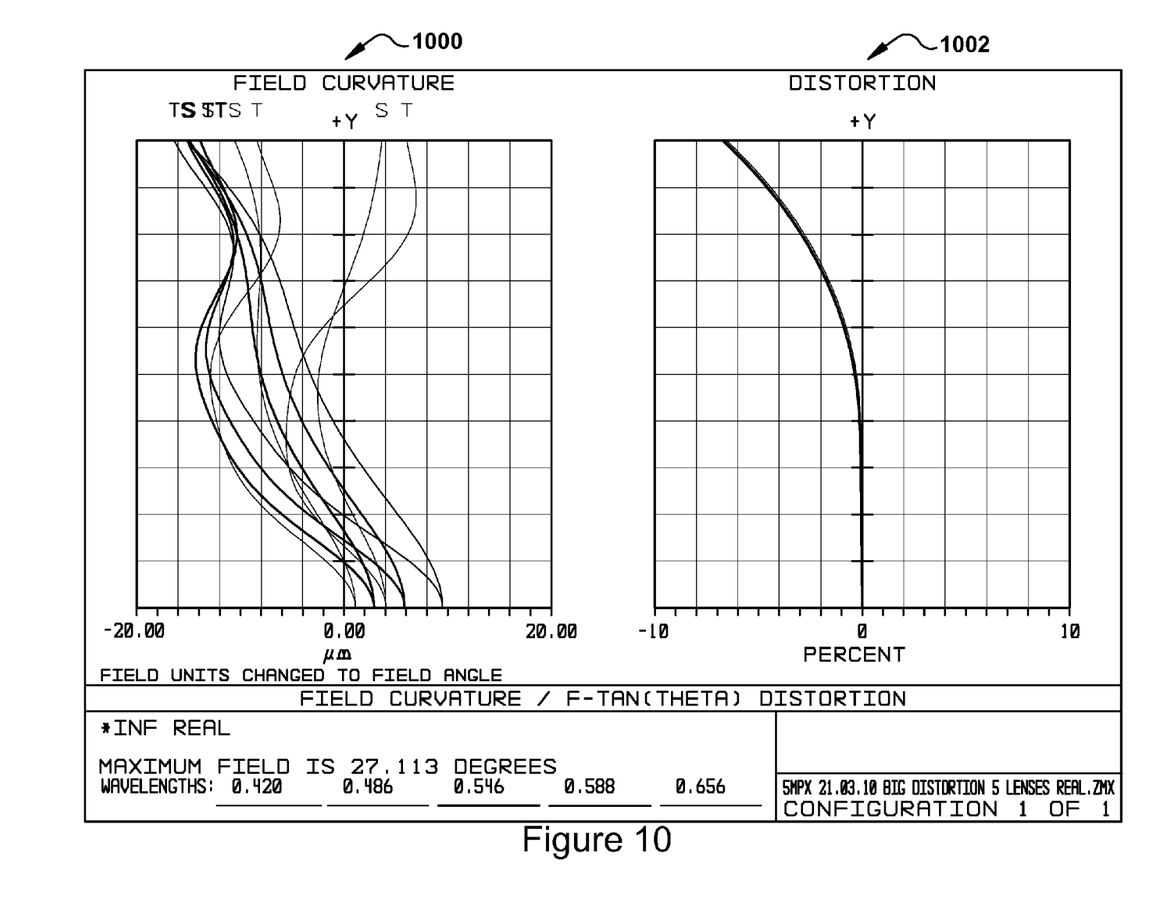
FIG. 10 illustrates a field curvature graph and a distortion graph, according to an aspect.

FIG. 10 illustrates a field curvature graph 1000 and a distortion graph 1002, according to an aspect. The field curvature graph 1000 (on the left side) is for the optical system. Further, the field curvature values are displayed for several wavelengths. The distortion graph 1002 (right side) illustrates, according to an aspect, the renormalized (to the center) lens distortion of the relative illumination lens as functions of the half angle of view. This intentional distortion is designed to be within the range of about –7 percent in order to achieve the disclosed relative illumination property.

In accordance with some aspects, the imaging lens disclosed herein can be characterized by varying distortion with a maximal distortion of about 8.5 percent. The distortion can increase by increasing the angle of the field of view where the maximal distortion is obtained at a half angle of view of about 27.11 degrees.

Figure 11:
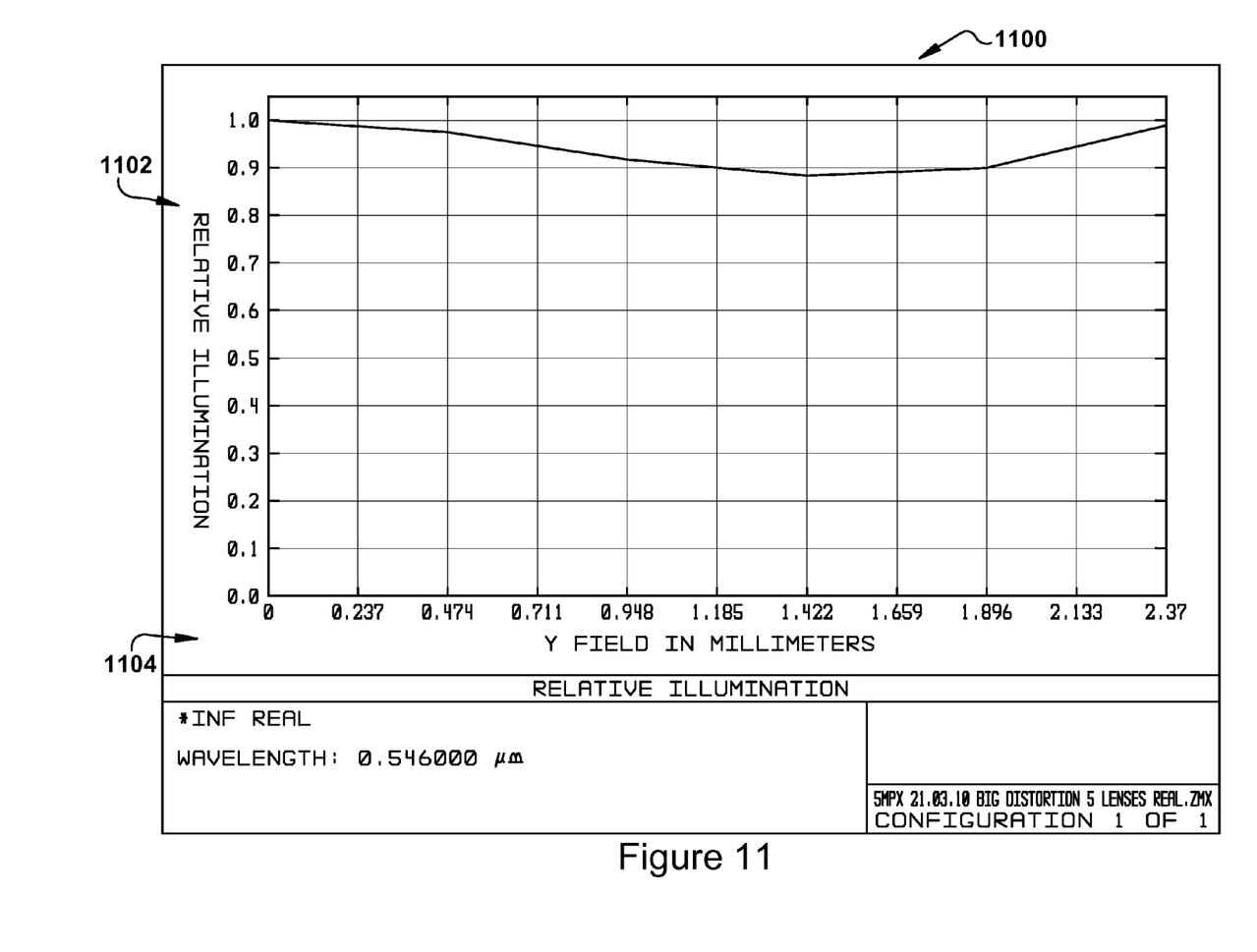
FIG. 11 illustrates a relative illumination graph, according to an aspect.

FIG. 11 illustrates a relative illumination graph 1100, according to an aspect. The relative illumination 1102 is illustrated along the vertical axis and Y field in millimeters 1004 is illustrated along the horizontal axis. The relative illumination is shown as a function of distance from the center of the sensor. It is evident that unlike the relative illumination of a conventional lens, as shown in FIG. 1, the illumination over this sensor in accordance with the disclosed aspects is substantially uniform.

The word "exemplary" is used herein to mean serving as an example, instance, or illustration. For the avoidance of doubt, the subject matter disclosed herein is not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used, for the avoidance of doubt, such terms are intended to be inclusive in a manner similar to the term "comprising" as an open transition word without precluding any additional or other elements.

In addition to the various embodiments described herein, it is to be understood that other similar embodiments can be used or modifications and additions can be made to the described embodiment(s) for performing the same or equivalent function of the corresponding embodiment(s) without deviating there from. Still further, multiple processing chips or multiple devices can share the performance of one or more functions described herein, and similarly, storage can be effected across a plurality of devices. Accordingly, the invention should not be limited to any single embodiment, but rather should be construed in breadth, spirit and scope in accordance with the appended claims.

What is claimed is:

1. A lens system designed to provide a distorted image for relative illumination, comprising:
an aperture stop; and
a group of lenses in a fixed position along an optical axis, the group of lenses comprising:
a first lens comprising a positive refractive power and a convex surface on an object side near an optical axis;
a second lens comprising a negative refractive power and a meniscus shape in which a concave surface is on the object side near the optical axis;
a third lens comprising a shape in which the convex surface is on the object side near the optical axis;
a fourth lens comprising a shape in which the convex surface is on the object side near the optical axis; and
a fifth lens comprising a small negative refractive power and a meniscus shape in which the concave surface is on the object side near the optical axis;
wherein the aperture stop and the group of lenses are arranged along the optical axis in order from the object side;
wherein at least one surface of the first lens is aspherical;
wherein both surfaces of each of the second lens, the third lens, the fourth lens, and the fifth lens are aspherical; and
wherein the first lens, the second lens, the third lens, the fourth lens, and the fifth lens are made of plastic.

2. The lens system of claim 1, wherein the following conditions are satisfied: $v\_d1-v\_d2>30$ and $v\_d4-v\_d3>30$, where:
$v\_d1$ is a first Abbe number of the first lens;
$v\_d2$ is a second Abbe number of the second lens;
$v\_d3$ is a third Abbe number of the third lens; and
$v\_d4$ is a fourth Abbe number of the fourth lens;
wherein a ratio of a total track length of the lens system to an image circle diameter is less than about 1.172; and
a ratio of a back focal distance to an effective focal length is less than 0.155.

3. The lens system of claim 1, wherein the group of lenses comprises a field of view between about 45 degrees and about 30 degrees.

4. The lens system of claim 1, wherein a zoom lens comprises a field of view between about 40 degrees and about 35 degrees.

5. The lens system of claim 1, wherein the group of lenses includes only five lens elements.

6. The lens system of claim 1, wherein opposing surfaces of the first lens and the second lens are aspheric, and wherein the third lens comprises a positive refractive power and the fourth lens comprises a small positive refractive power.

7. The lens system of claim 1, wherein an equation $f\_1/f < 0.72$ is satisfied, where $f\_1$ is a focal length of the first lens and $f$ is an effective focal length of the lens system.

8. The lens system of claim 7, wherein the fifth lens comprises a varying power which is negative at its vertex and is increases positively with radial distance from the vertex.

9. The lens system of claim 7, wherein the lens system comprises a varying distortion, wherein a maximal distortion is about 8.5 percent and the varying distortion is increased by an increase in an angle of a field of view where the maximal distortion obtained at a half angle of view is about 27.11 degrees.

10. The lens system of claim 7, wherein the group of lenses comprises a F number of about 3.5 including through a focus modulation transfer function (MTF) of the group of lenses indicates an MTF contrast level of at least about 0.15 at a spatial frequency of about one-half of a Nyquist frequency of a sensor for a given object distance associated with an image distance from the lens system, and wherein the MTF varies with the image distance such that the MTF is at maximum value greater than about 0.5 at a selected first object distance corresponding to 1000 mm distance and decreases from about a maximum MTF to a lower value that is greater than about 0.15 corresponding to an object distance of about of 380 mm.

11. The lens system of claim 7, wherein a variation of a chromatic focal shift of an imaging lens is about 8.4 micrometers.

12. The lens system of claim 7, wherein a relation of lateral color of an imaging lens is about 0.5-1 micrometers.

13. The lens system of claim 1, wherein a refractive index of each lens in the group of lenses is within a range of about 1.5 to 1.65 and a first Abbe number of the first lens, a second Abbe number of the fourth lens, and a third Abbe number of the fifth lens are between 50 to 60, and a fourth Abbe number of the second lens and a fifth Abbe number the third lens are between 20 to 30.

14. An optical system arranged along an optical axis, comprising:
   a first lens comprising a positive refractive power and a convex object side surface;
   a second lens comprising a negative refractive power and a concave object side surface;
   a third lens and a fourth lens both comprising respective convex object side surfaces;
   a fifth lens comprising a negative refractive power and a concave object side surface;
   wherein the first lens, the second lens, the third lens, the fourth lens, and the fifth lens are made of plastic; and
   wherein the following conditions are satisfied: $v\_d1 - v\_d2 > 30$ and $v\_d4 - v\_d3 > 30$, where:
   $v\_d1$ is a first Abbe number of the first lens;
   $v\_d2$ is a second Abbe number of the second lens;
   $v\_d3$ is a third Abbe number of the third lens; and
   $v\_d4$ is a fourth Abbe number of the fourth lens;
   wherein a ratio of a total track length of the optical system to an image circle diameter is less than about 1.172; and
   a ratio of a back focal distance to an effective focal length is less than 0.155.

15. The optical system of claim 14, wherein the first lens, the second lens, the third lens, the fourth lens, and the fifth lens are in a fixed position along the optical axis.

16. The optical system of claim 14, wherein opposing surfaces of the first lens and the second lens are aspheric, and wherein the third lens comprises a positive refractive power and the fourth lens comprises a negative refractive power.

17. The optical system of claim 14, wherein the optical system comprises a varying distortion, wherein a maximal distortion is about 8.5 percent and the varying distortion is increased by an increase in an angle of a field of view where the maximal distortion obtained at a half angle of view is about 27.11 degrees.

18. A camera module for an electronic device, comprising:
   a set of lenses arranged along an optical axis in order from an object side for producing a real image of an object with a distorted image for relative illumination such that a light distribution over the set of lenses is substantially uniform, the set of lenses comprising:
      a first lens comprising a positive refractive power and a convex surface on an object side near an optical axis;
      a second lens comprising a negative refractive power and a meniscus shape in which a concave surface is on the object side near the optical axis;
      a third lens comprising a shape in which the convex surface is on the object side near the optical axis;
      a fourth lens comprising a shape in which the convex surface is on the object side near the optical axis; and
      a fifth lens comprising a small negative refractive power and a meniscus shape in which the concave surface is on the object side near the optical axis;
   an optical correction module that provides distortion correction to produce a rectified image.

19. The camera module of claim 18, wherein at least one surface of the first lens is aspherical, both surfaces of each of the second lens, the third lens, the fourth lens, and the fifth lens are aspherical; and wherein the first lens and the fourth lens are made of a first type of optical plastic, the second lens and the third lens are made of a second type of optical plastic and the fifth lens is made of a third type of optical plastic.

20. The camera module of claim 18, wherein the set of lenses are arranged in a fixed position along an optical axis.

* * * * *